(12) United States Patent
Reffner et al.

(10) Patent No.: US 6,907,390 B1
(45) Date of Patent: Jun. 14, 2005

(54) MINIATURIZED OPTO-ELECTRONIC MAGNIFYING SYSTEM

(75) Inventors: John A. Reffner, Millersville, MD (US); Donald W. Sting, New Canaan, CT (US)

(73) Assignee: Smiths Detection Inc., Danbury, CT (US)

( * ) Notice: Subject to any disclaimer, the term of this patent is extended or adjusted under 35 U.S.C. 154(b) by 0 days.

(21) Appl. No.: 10/009,806

(22) PCT Filed: Dec. 13, 1999

(86) PCT No.: PCT/US99/29559

§ 371 (c)(1),
(2), (4) Date: Nov. 13, 2001

(87) PCT Pub. No.: WO00/36440

PCT Pub. Date: Jun. 22, 2000

Related U.S. Application Data

(60) Provisional application No. 60/112,172, filed on Dec. 14, 1998.

(51) Int. Cl.[7] .................................................. G06G 7/48
(52) U.S. Cl. ................................................ 703/5; 359/380
(58) Field of Search .................... 703/5; 359/380, 359/368, 379; 382/148

(56) References Cited

U.S. PATENT DOCUMENTS

| | | | |
|---|---|---|---|
| 3,735,139 A | * | 5/1973 | Kalitinsky et al. .... 250/214 VT |
| 4,963,903 A | | 10/1990 | Cane |
| 5,497,267 A | | 3/1996 | Ishikawa et al. |
| 5,506,416 A | | 4/1996 | Rizvi |
| 5,581,085 A | | 12/1996 | Reffner et al. |
| 5,616,922 A | | 4/1997 | Reffner et al. |
| 5,689,740 A | * | 11/1997 | Uchiyama .................... 396/101 |
| 5,741,213 A | | 4/1998 | Kouchi et al. |
| 5,749,570 A | * | 5/1998 | Iwata et al. .............. 271/10.13 |
| 6,208,609 B1 | * | 3/2001 | Hang et al. ............ 369/112.26 |

\* cited by examiner

Primary Examiner—Albert W. Paladini
(74) Attorney, Agent, or Firm—Foley & Lardner LLP

(57) ABSTRACT

An opto-electronic image magnifying system. The magnifying system includes: a light source (38, 39) which illuminates an object to be viewed; a miniaturized opto-electronic magnifier module (MOM), made of a lens (31) and a photodetector array (32), which receives the light from the illuminated object; an electronic circuit (34) which receives the signal from the MOM; a video-monitor (35) which receives the magnified signal from the electronic circuit and displays the image. The opto-electronic image magnifying system allows for small objects or features of small objects to be observed in which historically compound microscopes or specialized optical viewing systems were required to observe the small objects.

42 Claims, 8 Drawing Sheets

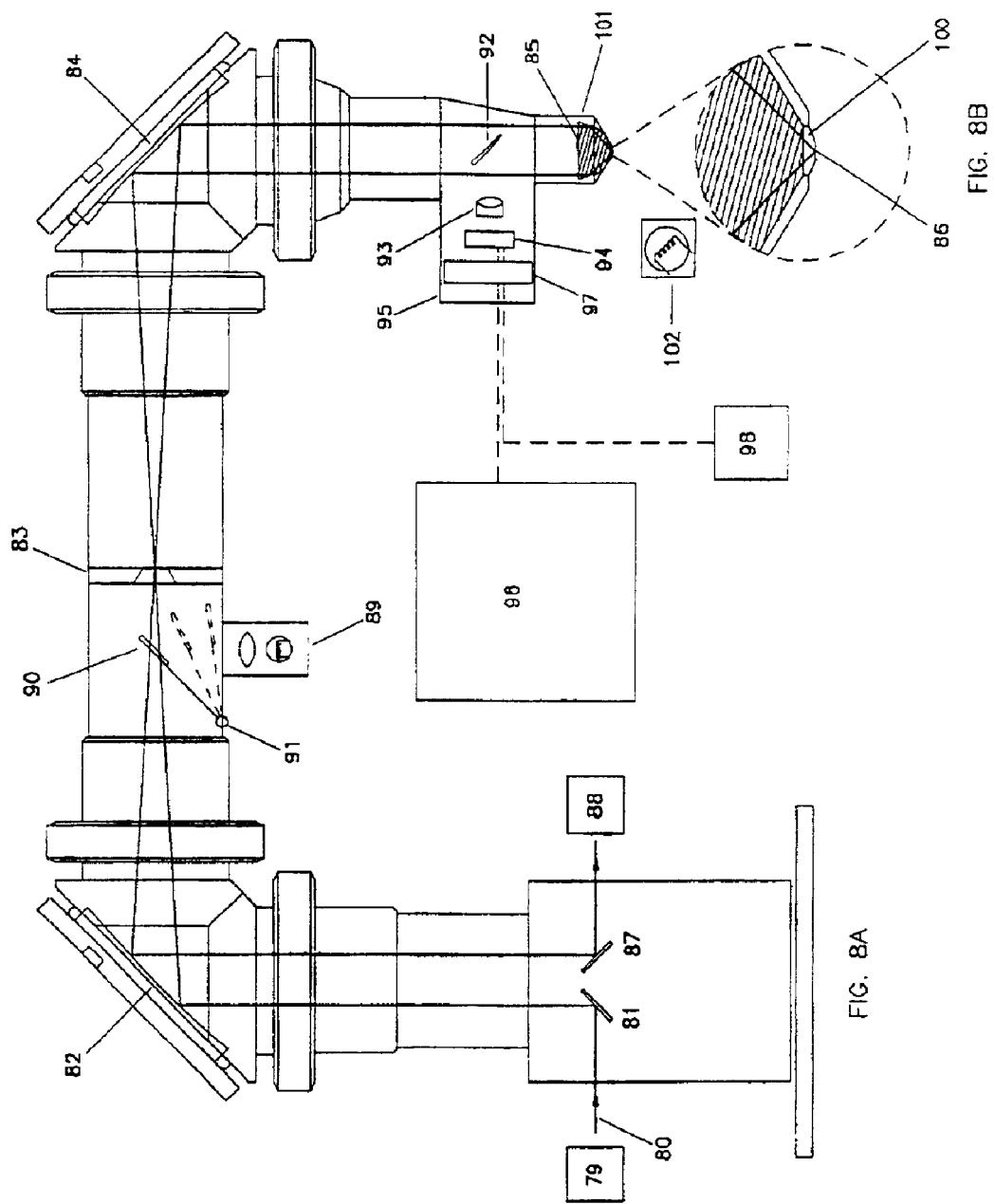

MINIATURIZED OPTO-ELECTRONIC MAGNIFYING SYSTEM

RELATED CASES

Applicant hereby claims the benefit of their copending provisional application Ser. No. 60/112,172, filed Dec. 14, 1998.

FIELD OF THE INVENTION

This invention relates to the ever-increasing need in industry, commerce, and education to observe small objects or very small features of objects and to characterize those objects and or features. Historically, such observations have been made on compound microscopes or specialized optical viewing systems.

BACKGROUND OF THE INVENTION

Leeuwenhoek founded the science of microbiology in about 1700 using a single-lens microscope. His bead of glass had a magnification of 266 times. Fifty years earlier the compound microscope had been discovered. Although Leeuwenhoek's single-lens microscope produced higher resolution and better image quality than the compound microscope, it did not withstand the test of time. The compound microscope, with objective and eyepiece lens systems, became the standard for all modern light microscopes. The principle reason for success of the compound microscope was its ease-of-use. To use the Leeuwenhoek microscope, the sample and microscope had to be placed very close to the eye. This made Leeuwenhoek's simple microscope difficult, and many times nearly impossible, to use. Over the centuries, the compound microscope has been improved and enhanced, but it has largely maintained its use of an objective lens with a relatively long (at least 160 mm) distance to the image formation plane, and an eyepiece to perform second stage magnification and presentation to the human eye.

Lenses are used to create real images in cameras and projectors of many kinds, including video cameras, the part of a television transmitting apparatus that receives the primary image formed by a lens on a light-sensitive material and transforms it into electrical impulses. In its standard use, a video camera transmits images of large objects onto a monitor screen. The image produced by the lens on the light-sensitive material is reduced in size, or demagnified. As objects are brought closer to the lens they appear larger on the monitor screen, but the lens does not create an image larger than the object. Even in a macro mode, the image formed by the lens on the light-sensitive material is not magnified.

A lens creates a magnified image either as a virtual image or as a real image. If an object is placed at a distance closer to the lens than its focal length, then a magnified virtual image is seen when the eye is placed close to the lens. This is the Leeuwenhoek microscope.

If an illuminated object is placed at a distance greater than the focal length of the lens, but less than twice the focal length of the lens, then a magnified real image is projected. The objective lens of the compound light microscope projects a magnified real image. Viewing this real image requires an eyepiece lens or screen. The eyepiece lens magnifies the real image and transforms it into a magnified virtual image seen with the eye. This combination of objective and eyepiece lenses is the compound microscope.

Compound microscopes have been the standard configuration for a light microscope for over two hundred years. They continue to be a primary tool for science and technology. The height of compound microscopes usually exceeds 16 inches and is often much larger. A sample must be positioned on a stage and mechanical devices are required so each person using the microscope can adjust the focus for his/her eyes. People requiring corrective eyeglasses often have difficulty using eyepiece lenses. Special "high eyepoint" eyepieces might be required.

Light microscopes have magnifications that range from 5 to 2,000 times. Most of this magnification is produced by the objective lens that typically has a magnifying power range from 0.5 up to 160 times. The objective lens projects an image 160 mm or more (infinity corrected systems use 180 mm telan lenses to form the primary image) from the objective lens. This projection distance (or tube length) combined with the eyepiece lens is a major factor which establishes the physical size of the microscope. Eyepiece magnifications range from 5 to 20 times, and since the eye must be placed closer to the lens of a high magnification eyepiece, higher magnification eyepieces are difficult to use. A 10 times eyepiece is common, while the majority of light microscopy applications use magnifications between 10 and 500 times.

Video microscopy has been a useful technology for several decades to extend the capability of the compound light microscope. The early uses are documented by Inoue' in *Video Microscopy*, Plenum Press, New York, 1986. The most common implementation of video microscopy is to attach a video camera to the accessory port on a trinocular viewer. While several types of video cameras were used for video microscopy, the current state-of-art is to use solid-state charge coupled devices (CCD). For low light levels, cooled CCD video cameras are used because of their increased sensitivity. These cameras are very expensive, but have demonstrated unique sensitivity for certain biological applications. The most common uses of video microscopy are to supplement visual observations, record images and provide digital images for image analysis using a digital computer.

When using a compound microscope for photography or video microscopy, a camera apparatus replaces the eye. These cameras contain an additional lens to project a real image onto the film or electronic video-imaging device. Video camera accessories require a special eyepiece lens to reduce the effects of the electronic scaling. In all cases, adding photographic or video cameras increases the size, complexity and cost of the compound light microscope. The addition of a video camera to a compound light microscope can add six to ten inches.

Video cameras have been incorporated into microspectrometer systems for electronic imaging. The system disclosed in U.S. Pat. No. 5,581,085 (Reffner and Wihlborg) used a built-in video camera to generate an electronic image for sample viewing and image recording. Several micro-Raman spectrometer systems use video imaging to protect the viewer from exposure to the laser radiation that is used to generate the Raman spectra. All of these systems use the principles of the compound light microscope with an objective lens, one or more intermediate lenses and a video camera. These video microscope systems use conventional microscope optics with long tube-lengths and add-on video cameras. The standard tube-length is 160 mm (6.3 inch) and the addition of a video imaging system can more than double this length.

Combining microscopes with spectroscopes, spectrometers or spectrographs to provide spectrochemical analysis of small objects or small features of objects has a history of over 125 years (Ford, *Single Lens, The Story of the Simple Microscope*, Harper & Row, New York, 1985). The early microspectrometers were combinations of visible light microscopes and dispersive spectrometers used for color analysis. In 1949, the first uses of infrared radiant energy in microspectroscopy were reported by Gore, R. C., *Science*, 110, 70 (1949) and Barer et al, *Nature*, 163, 198 (1949). In 1953, the first commercial, infrared microspectrometer accessory was produced (Coats et al, *J. Opt. Soc. Am*, 43, 984, (1953). It was not until the development of Fourier transform infrared (FT-IR) spectrometers that infrared microspectroscopy became a practical technology. The first microscope accessories for FT-IR were introduced in 1983. The design of these accessory microscopes followed the general teachings and design of the compound light microscopy for imaging and spectral measurements.

The wavelength (lambda) of radiation and objective lens aperture limits the spatial resolution of all microscopes. This diffraction limited spatial resolution (d) for a microscope with a limiting numerical aperture (N.A.) is d=(0.62 lambda/ N.A.). As the diffraction limited spatial resolution value becomes smaller, the resolving power of the microscope becomes higher. In video microscopy, the resolution element of the photo detector array is an additional factor that can limit resolution. To meet the Nyquest limit, two picture elements are required for a specified resolution to be recorded.

Radiant energy in the mid-infrared range (2.5 to 25 micrometers) is the most useful for the analysis of molecular compounds like organic substances, certain ionic salts and silicate minerals. In this spectral range, the conventional diffraction limited spatial resolution is generally considered to be about 10 micrometers.

To improve spatial definition of the sample area in infrared microspectrometry, Messerschmidt and Sting (U.S. Pat. No. 4,877,960) applied the principles of confocal microscopy. In this development, a pair of image plane masks was used to achieve the confocal geometry as introduced by Minsky (U.S. Pat. No. 3,013,467). Using masks, however, adds complexity and cost to microscopes that are used for infrared microscopical analysis.

Internal reflection microanalysis is achieved by reducing the area of the sample contacting the internal reflection element (IRE) as revealed by Sting and Reffner (U.S. Pat. No. 5,172,182). The teachings of Sting (U.S. Pat. No. 5,093,580) reveals a reflecting ATR microscope objective and a mechanical slider containing aperture masks to select different optical paths through an attached IRE. The ATR objective requires shifting aperture masks between viewing a sample through the IRE and recording its ATR spectrum. By selecting different optical paths, it is possible to collect ATR spectra, observe sample contact or see the sample. While microanalysis with the ATR objective was made easier by these three modes, they added significant cost and complexity.

SUMMARY OF THE INVENTION

The invention relates to a miniaturized opto-electronic image magnifying system, i.e. a system for producing enlarged images of objects in which part of the magnification is provided by one or more lenses or other optical elements and the balance is provided by an electronic scaling system. This miniaturized opto-electronic system is comprised of a lens or lens system such as a variable focal length zoom lens (as used herein, the term "lens" is intended to encompass both single lenses and systems with multiple lenses, such a compound lenses and zoom lenses), an array of solid-state photo-detectors, and electronic circuits that provide input to electronic display apparatus such as a television, video monitor or computer monitor screen. The lens or lens system projects a magnified real image of an illuminated or luminous object, or some portion thereof, directly onto the small solid-state photo-detectors, which produce an electronic signal that is representative of the magnified real image projected on the photo-detectors. This optical image is then further enlarged electronically when it is displayed on the display screen. The image focus on the detector is the same for all individuals viewing the screen. Seeing the image on a screen is convenient and viewers can wear their corrective glasses as needed.

The core of this invention is the combination of a lens or lens system with a small solid-state photo-detector. This combination is referred to in this application as a miniaturized opto-electronic magnifier (MOM) module. The miniaturized opto-electronic image magnifying system of this invention eliminates the need for conventional microscope objectives and eyepieces by using the MOM module in combination with a video display monitor. It thereby regains the benefits of the Leeuwenhoek microscope, such as compact size and simple optics, while eliminating its major problem of forcing the observer to be near both the eyepiece lens and the object under observation. Using our invention, the eye is moved from near the lens of the Leeuwenhoek microscope to a location of comfortable viewing of a computer monitor or television screen. While neither the idea of viewing a projected magnified image on a screen nor the adaptation of a video camera to a microscope is new, our invention's novelty make it possible to magnify images of objects in a uniquely simple and unexpected way that provides "visual access" not previously available at affordable prices.

The MOM module is substantially smaller than standard compound light microscopes, which typically have a tube-length of 160 mm. The size of our MOM modules is reduced by selecting the appropriate focal length lens combined with a small photo-detector array to achieve the desired magnification. The small MOM module, which may have an overall height of about 25 to about 100 mm, can be placed within devices to produce magnified images that can be observed remotely on a separate video-monitor screen.

The total magnification of this opto-electronic image magnifying system is the product of the optical magnification and the electronic scaling. For most systems, the electronic scaling will be from about 20 to about 100 times, whereas the optical magnification by the lens or lens system will be about 2 to 20 times. The optical magnification will more typically be about 2 to about 10 times, and even more typically about 2 to 5 times. Thus, the majority, but not all, of the magnification typically results from the electronic scaling. In preferred combinations, the electronic scaling be the major component to the overall magnification, and the optical magnification will be the minor component. The ratio of the magnification provided by electronic scaling and the magnification provided by optical magnification will generally be between about 1.5 to 1 and 30 to 1, and will more typically be between about 4 to 1 and about 10 to 1.

The miniaturized opto-electronic magnifying system of this invention eliminates the need to look through a microscope eyepiece and objective lens system or to incur the significant cost of a video camera coupled to a compound microscope system. Instead, the magnified electronic image is seen solely on the monitor screen without using an associated compound microscope. The system alone provides significant benefits in the form of very small, low cost magnifying systems such as inverted microscopes and the like, for viewing insects, soil, plants and minerals. When coupled with other sensing technologies such as FT-IR or Raman spectroscopy, even more dramatic benefits result from seeing samples that are being analyzed, such as defects in packaging materials or analyzing trace forensic evidence.

A preferred embodiment of this invention allows continuous viewing of a magnified image of the sample and simultaneous collection of ATR spectra by internal reflection spectroscopy. This makes the internal reflection apparatus more stable and easier-to-use while lowering cost. Viewing the sample through the IRE has special value in microanalysis, providing visual confirmation of what object or feature is being analyzed. Internal reflection is very useful for spectral analysis of polymers and other organic objects and is particularly useful for analyzing surfaces of thick, opaque materials. Locating areas for spectral analysis on thick opaque samples requires looking through the IRE.

Another preferred embodiment of this miniaturized opto-electronic magnifying system is for use with commercial FT-IR spectrometers for internal reflection spectral analysis. The MOM module fits within an internal reflection accessory providing magnified images of the sample (object) while it is being analyzed by infrared spectroscopy. The internal reflection accessory is mounted in the sample compartment of a general purpose FT-IR spectrometer. The space limitations of the spectrometer's sample compartment restrict access for normal viewing of the sample through the internal reflection element (IRE). A MOM module placed within the internal reflection accessory makes it possible to look through the IRE and see material contacting the IRE. While the viewing light path and the internal reflection radiant energy path are separate in the internal reflection element, their paths converge on the same point on the sample. Because these optical paths are separate, the sample can be visually observed simultaneously with the recording of its infrared spectrum.

In another form, the MOM module of this invention is incorporated in a spectrometer system dedicated to internal reflection microanalysis. Either the internal reflection imaging accessory or the dedicated system is able to use a plurality of single or multiple reflection IRE's. This unique combination of magnified video observation and internal reflection FT-IR microspectroscopy results in a simple, inexpensive apparatus which can be used to analyze a wide range of materials including organic compounds, drugs, plastics, paint, and most minerals.

DRAWINGS

The invention will be described now by way of example only, with particular reference to the accompanying drawings, wherein.

FIG. 8a is a schematic drawing showing the miniaturized opto-electronic magnifying system of the present invention placed in an ATR probe apparatus for viewing an area of an internal reflection element with controlled infrared illumination of the analyte area for ATR spectral measurement; and FIG. 8b is an expanded view of the probe tip in FIG. 8a, provided by the miniaturized opto-electronic magnifying system in the ATR probe apparatus of that Figure.

DETAILED DESCRIPTION

Figure 1:
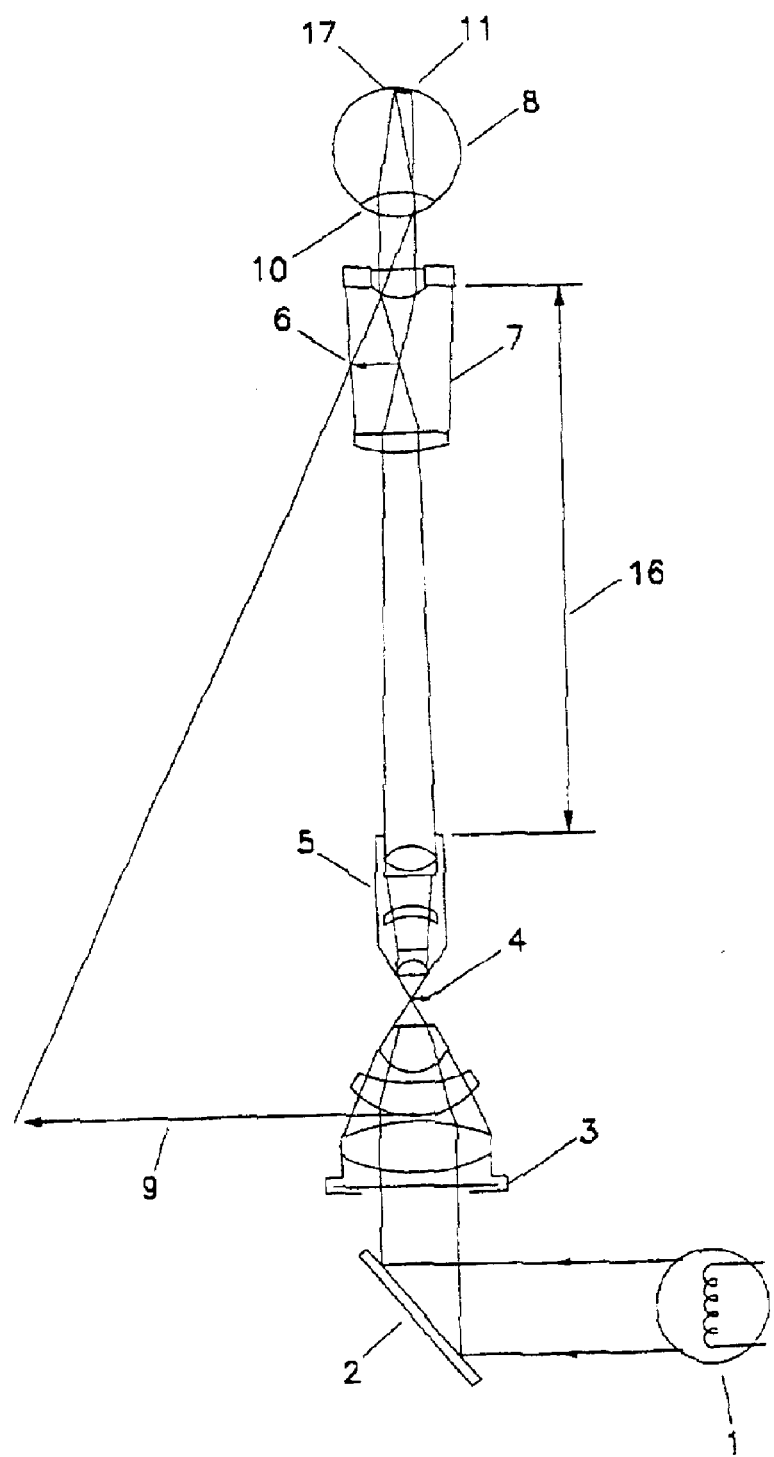
FIG. 1 is a schematic drawing of the current state of art of the conventional compound light microscope used for direct viewing of a magnified image showing the principal elements.

FIG. 1 shows the principal elements of a conventional compound light microscope used for direct viewing of an optically magnified image. The conventional compound light microscope consists of an illumination source 1, a mirror 2 directing the light into the condenser lens 3 that directs the light to illuminate an object 4. Objective lens 5 projects a real image 6 of the illuminated object into an eyepiece lens 7, eye 8 views a virtual image 9 and an eye lens 10 forms a real image 11 of the object on the retina 17.

Figure 2:
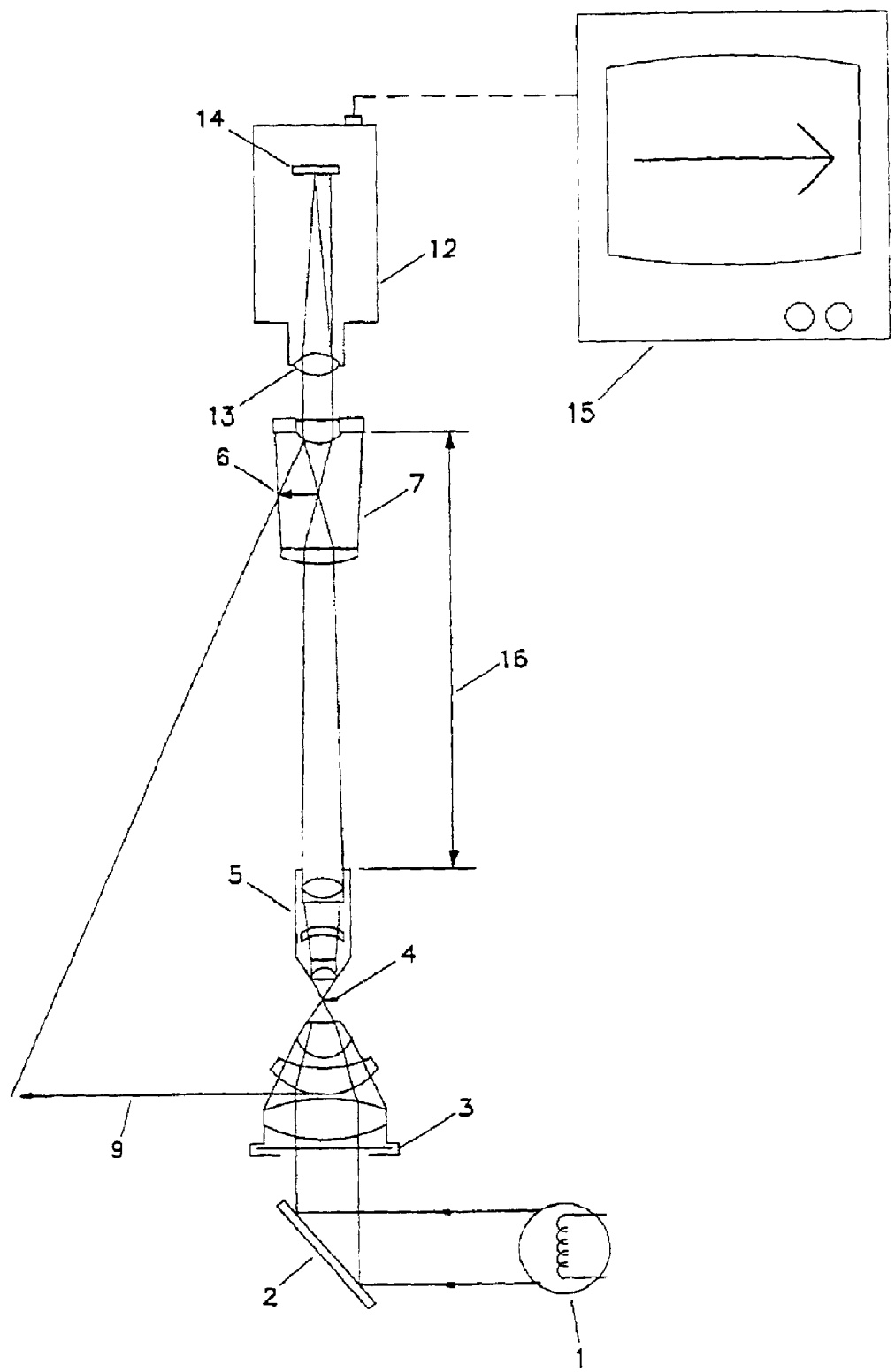
FIG. 2 is a schematic drawing of the current state of art in video microscope technology showing the principal elements.

The present art for converting a compound light microscope into a system for electronic imaging, shown in FIG. 2, is to replace the eye 8, of FIG. 1, with a video camera 12 consisting of a lens 13 and an electronic imaging element 14. The video camera is usually mounted in a separate port to retain normal direct viewing through conventional eyepiece lenses. The electronic image is displayed on a video-display screen 15.

While compound light microscopes have been built in many shapes and sizes, the microscope of today is a large, complex, versatile scientific instrument. The mechanical distance from the objective lens mount to the seat of the eyepiece lens it called the mechanical tube length 16. The standard light microscope has a tube-length of 160 mm or longer. The addition of a video accessory to a conventional compound light microscope adds size and complexity.

Electronic imaging has had a major impact on conventional microscopy, especially in the field of electronic image analysis and increased sensitivity to detection of small contrast differences. Those skilled in the art will appreciate the manor in which such a microscope operates and a full explanation of this operation is not required for purpose of understanding the present invention.

This invention reduces the size and complexities of a microscope so it can be used to observe objects that are inaccessible or too costly to inspect with a conventional microscope. As noted above, the core of this invention is the miniaturized opto-electronic image magnifier module, i.e. the combination of a lens with one or more arrays of small solid-state photo-detectors. The photo-detectors may be a component of a charge-coupled (CCD) camera. They may also be part of a simple board camera, i.e. a printed circuit or other board on which the photo-detectors are mounted, with circuitry that produces a signal that is representative of the image on said photo-detectors. A ¼ inch CCD camera and a 12 mm focal length lens is an example of a MOM module.

Figure 3:
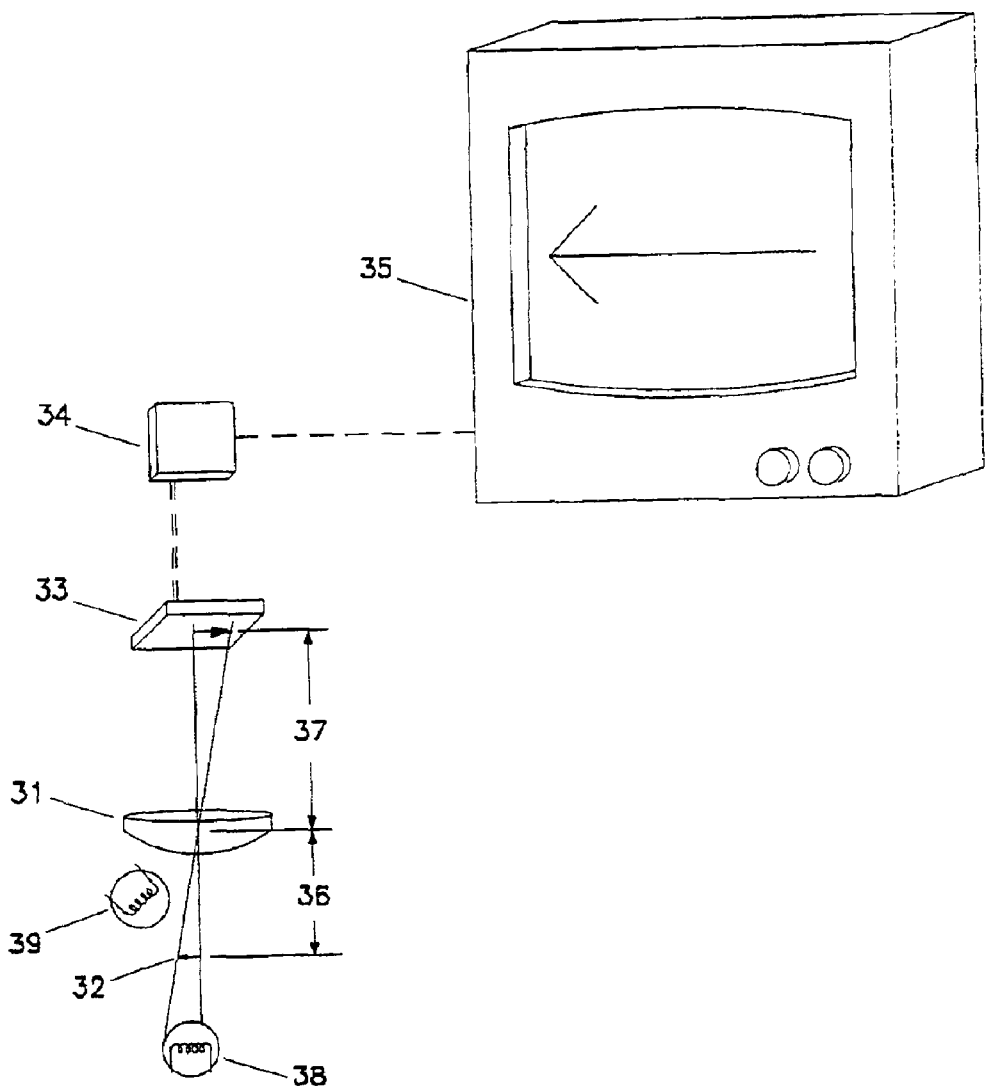
FIG. 3 is a schematic drawing of the miniaturized opto-electronic magnifying system of the present invention showing the principal elements.

With reference to FIG. 3, the lens 31 forms a real image of a luminous or illuminated object 32 onto a solid-state photo-detection array 33. Since the object may be either transparent or opaque, two visible light illumination sources 38 and 39 are provided. Lens 31 and photo-detector array 32 form the MOM module. Each element of the array detector contains a pixel of the magnified image. The electronically generated signal from the MOM module is processed by an electronic circuit 34 and a magnified image is displayed on a video-monitor 35. In many systems, photodetector array 32 and electronic circuit 34 will be combined in a system such the CCD camera mentioned above. However, for certain applications, e.g. when a MOM module is placed within compact apparatus such as Fourier transform spectrometers, thermal analysis systems and miniaturized probes for visual inspection, the photo-detector arrays 32 may be combined with lens 31 to form the MOM module, and electronic circuit 34 may be located at another, convenient location, as illustrated in FIG. 3. In applications of this sort, board cameras may be particularly advantageous.

Miniaturized solid-state charge coupled device (CCD) video cameras are used in this invention to produce a miniature scale alternative to a microscope. Commercial CCD video cameras (such as CHUGAI BOYEKI (America) Commack, N.Y. 11725, Model CEC100) are compact and have ¼ inch CCD elements. This camera has a small size, 1.25 inches square (3 boards) by 1.0 inch height. The CCD has 512 horizontal (H)×492 vertical (V) elements and its scanning size is 3.69(H)×2.76(V) mm. This camera has a TV line resolution of 330(H)×330(V).

This CCD camera illustrates the principle of electronic scaling. An image formed on the CCD solid-state array is displayed on a monitor screen. If the monitor's screen horizontal (H) size is 10 inches (254 mm), then 254/3.69= 68.8 is the electronic scaling factor for this system. If a lens or lens system formed an image magnified 3 times on the CCD element, then the image seen on the monitor would be magnified 3×68.8 or 206.4 times. As may be readily appreciated, electronic scaling is a major element of this invention.

It is possible to use other miniature video cameras with different geometry, size of CCD solid-state array and other video monitors. In order to match commercially available lenses that are well suited for this invention, the camera, or other solid-state photo-detector array, should be less than 1 inch wide (measured along the diagonal), have a density of pixel elements equal to the monitor screen resolution and detect a minimum luminance of less than 50 lux.

A lens is used in combination with a CCD solid-state array to form a miniature opto-electronic magnifier (MOM) module of the miniaturized opto-electronic magnifying system of this invention. The lens produces an image of specific size and resolution to achieve a desired magnification in the final electronic image. The magnifying power of the lens is calculated as the ratio of the image to object size. The image size equals the size of the CCD solid-state array. Using the CCD solid-state array and monitor described above, the lens magnification and resolution are calculated for a final magnification of 3×68.8=206.4 times. The total magnification equals the product of the optical magnification and electronic scaling factors, so in this example the optical magnifying power is 3 times. For this CCD solid-state array, the horizontal dimension is 3.69 mm. The maximum object size for a three times magnification is 3.69/3=1.23 mm. This 1.23 mm object is imaged onto 512 elements, therefore each CCD array element has an image element size equaling 1.23/512= 0.0024 mm (2.4 microns). For the optical resolution to equal the electronic resolution, the lens must produce an image with a resolution of 2.4 micrometers. This means that the numerical aperture (NA) of the lens must satisfy the Abbe resolution criteria that d=wavelength/NA, wherein d is the minimum distance of separation that can be detected. For visible light this relation is NA=(0.5 E-3)/d, which in this example d=2.4 E-3 and NA=0.208.

The total magnification of this opto-electronic system is the product of the optical magnification and the electronic scaling. The optical magnification is the ratio of the object distance 36 to the image distance 37. The electronic scaling is the ratio of the size of the video-monitor screen 35 to the size of the photo-detector element 33. The majority, but not all, of the magnification typically results from the electronic scaling.

Table 1 lists properties of exemplar commercial lenses that are readily available that can be used to achieve the desired magnification, resolution and small total MOM module length. In order to match commercially available solid-state photoelectric array detectors, and achieve the advantages provided by this invention, the lens should be a single lens or lens system, with fixed or variable focal lengths (zoom lens system) and capable of producing an optical magnification of up to 20 times. The lens focal lengths should be in the range between 2 and 50 mm.

TABLE 1

Commercial Lenses for MOMs

| Optical Magnification | Focal Length | Resolution* | Lens Aperture (NA) | Object Distance | Image Distance | Total Length |
|---|---|---|---|---|---|---|
| 2 | 8 | 0.0048 | 0.1138 | 12.00 | 24.00 | 36.00 |
| 2 | 12 | 0.0048 | 0.1138 | 18.00 | 38.00 | 54.00 |
| 2 | 25 | 0.0048 | 0.1138 | 37.50 | 75.00 | 112.50 |
| 3 | 8 | 0.0024 | 0.2275 | 10.67 | 32.00 | 42.67 |
| 3 | 12 | 0.0024 | 0.2275 | 16.00 | 48.00 | 64.00 |
| 3 | 25 | 0.0024 | 0.2275 | 33.33 | 100.00 | 133.33 |
| 4 | 8 | 0.0012 | 0.4550 | 10.00 | 40.00 | 50.00 |
| 4 | 12 | 0.0012 | 0.4550 | 15.00 | 60.00 | 75.00 |
| 4 | 25 | 0.0012 | 0.4550 | 31.25 | 125.00 | 156.25 |

Distances for focal length, object distance, image distance and total length are in millimeters.
*Resolution is calculated for a CCD with 512 elements on a 3.69 mm (H) width.

As noted above, in most preferred combinations the electronic scaling will be the major component of the overall magnification, and the optical magnification will be the minor component. For a system using a 20-inch monitor and with a 0.25-inch solid-state array in the MOM module that produces a total magnification of 400 times, the electronic scaling component is 80 times and the optical magnification component is 5 times. In this example, the electronic scaling is 16 times greater that the optical magnification. This is in direct contrast to the conventional compound light microscope where all magnification is optical and the objective lens generally produces the bulk of the magnification. Since the optical magnification in the MOM module is typically less that 20 times, the lenses are less costly and require fewer lens elements to correct for aberrations.

Small element solid-state photo-detectors, such as CCD board cameras, were developed for commercial use in hand-held camcorders and security surveillance cameras. The elements are available in nominal sizes from, ¼ to ½ inches. Conventional ¼ inch cameras have arrays measuring about 3.96 mm horizontal (H) by about 2.79 mm vertical (V). The screen size of video monitors range from 5 to 20 inches and home video screens are available up to 48 inches wide. The electronic scaling can be very high. Presently, much of this electronic scaling is "empty magnification" in that the resolution is limited by pixel size and monitor screen resolution. Empty magnification is enlargement that exceeds the resolution of details; the image is larger but it does not reveal new details. Current video technology limits resolution, and hence the real total magnification of the miniature opto-electronic magnifying apparatus of this invention to 500 or less. However, the development of high definition TV, and future advances in video technology will raise the magnifying value to the optical diffraction limits for light microscopes and magnifications of 1,000 or more will be achievable.

In addition to providing electronic scaling, the solid-state photo-detectors are very sensitive and low levels of light intensity produce high quality images. In this invention, the increased sensitivity is used to simplify and reduce the cost of illuminators. Ambient lighting is sufficient for many applications. In other cases, low wattage lamps provide sufficient light.

Figure 4:
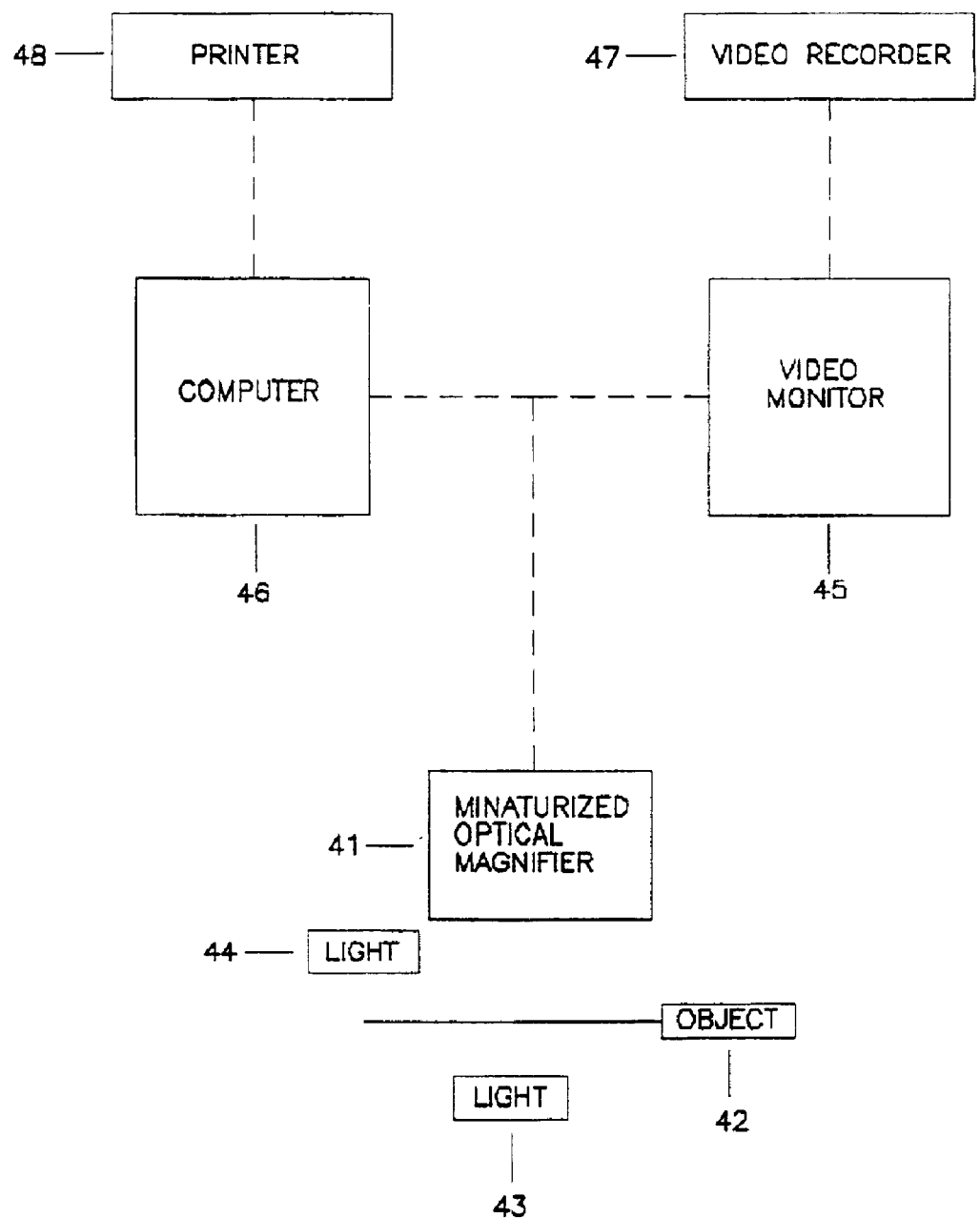
FIG. 4 is a block diagram of the miniaturized opto-electronic magnifying system outlining the component parts used in implementing a system in accordance with the present invention.

In its generalized form, the MOM module unit of this invention is one component of the miniaturized opto-electronic magnifying system. Referring to the block diagram of the system, FIG. 4, the MOM module 41 is positioned to view an object 42 which is illuminated by sources 43 or 44, the electronically signal from the MOM module 41 is transmitted to a video monitor 45 or computer 46. In addition a video recorder 47 and, or a printer 48 are examples of additional components which may be added to document magnified images.

The currently available miniature board cameras generate NTSC, PAL or S-video output. It is expected that these commercial video standards will change to improve TV quality, which will extend the applications of this invention.

Figure 5:
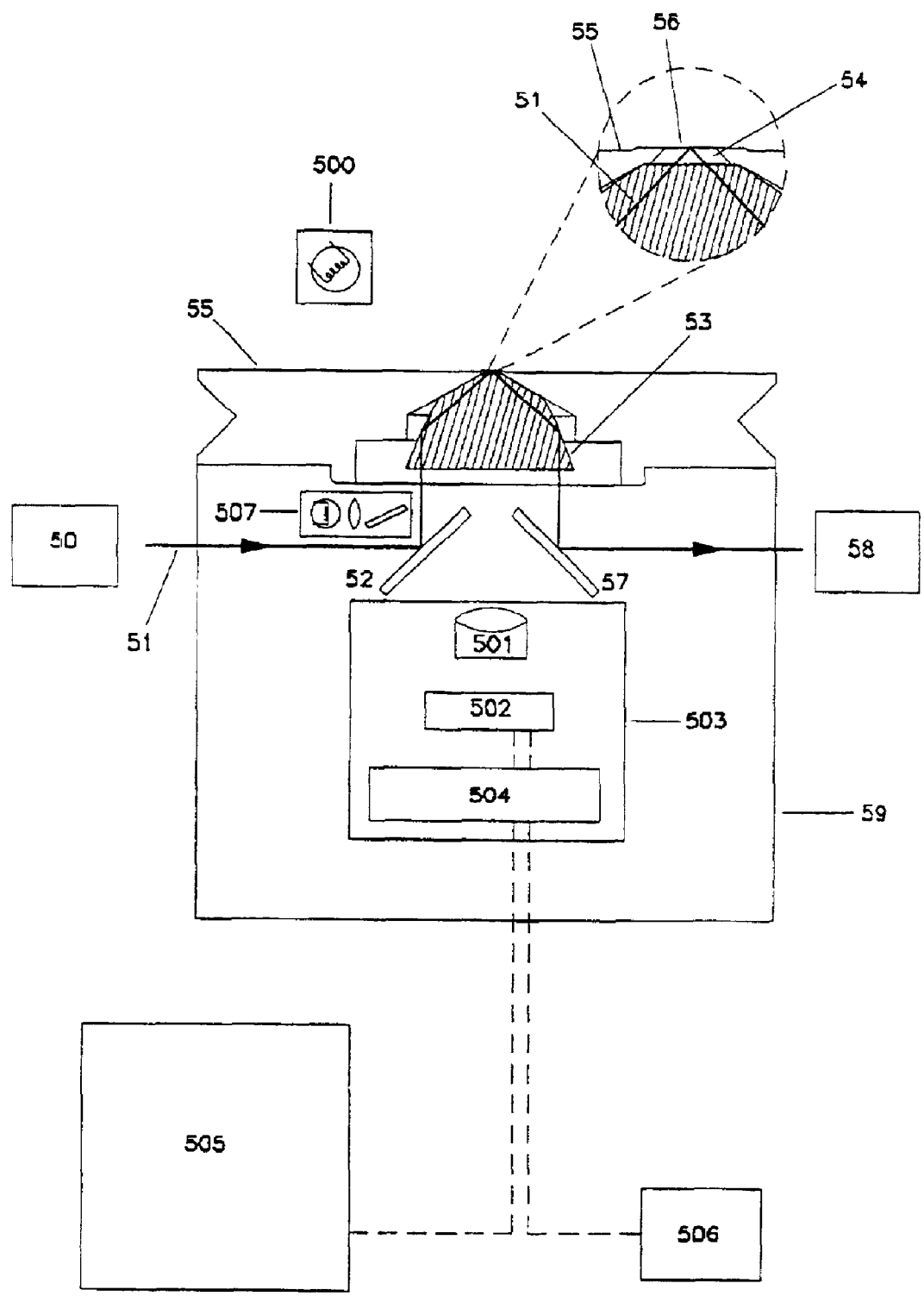
FIG. 5 is a schematic drawing showing the miniaturized opto-electronic magnifying system of the present invention placed in an internal reflection accessory used for infrared spectral analysis. A magnified image of the sample, placed on the internal reflecting element, is displayed on a video-monitor screen.

This invention provides miniaturized opto-electronic magnifying systems that are suitable accessories for internal reflection, infrared spectroscopic analysis. The internal reflection apparatus by ASI SensIR Technologies manufactured and sold as the DuraSamplIR™ is used as an example, however this invention is not limited to this. FIG. 5 is a schematic drawing of a miniaturized opto-electronic image magnifier module of this invention mounted within the body of the DuraSamplIR.

Referring to FIG. 5, infrared radiant energy 51 from a spectrometer 50 is directed by mirror 52 onto a zinc selenide (ZnSe) element 53 that transmits the infrared radiation through the diamond window 54 mounted in a fixture 55. At the diamond surface 56 the radiant energy is internally reflected so that it returns through the diamond window 54 and ZnSe element 53 and is directed towards mirror 57 which then directs it to a detector 58. A visible light source 500 illuminates surface 56 and this light is transmitted through the diamond window 54 and ZnSe element 53 where it is collected by lens 501 and the image of surface 56 is formed on the solid-state photo-detector 502. In FIG. 5, items 501, 502 and 504 are the MOM module 503. The electronic signal produced by the photo-detector is processed by the camera electronics 504 and the electronic signal is sent to a video-monitor 505 for viewing the magnified image of surface 56. The image on the video-monitor screen is magnified. The image may have the same geometrical orientation as the sample and movements left-to-right and up-and-down are the same for sample and image. The electrical power for the camera is provided by the power supply 506. For opaque samples, a visible light illuminator 507 is positioned below the ZnSe element 53. Because of the high sensitivity of the CCD photo-detector, low wattage illumination is all that is required.

In this form, a CCD element ¼ inch is preferred with a 12 mm focal length lens. With this combination in a DuraSamplIR, the IRE measuring 1.5 mm will be magnified to fill the monitor's vertical screen size.

Internal reflection spectroscopy is a very important method because it produces ATR infrared spectra to analyze liquid or solid samples without the need for extensive sample preparation. Optical contact between the internal reflection element (IRE) and the sample is the only requirement. The use of small IRE's was a major advance in internal reflection spectroscopy. Small contact surface makes analysis of solids more reproducible and quantitative. In transmission measurements in the mid-infrared spectral range, samples must be thin (0.03 mm or less) and uniform. This requires special care in preparing a sample for analysis. In internal reflection, the sample thickness is established by the wavelength of the radiation, the angle of incidence and the difference in refractive index between sample and IRE. Large IRE elements are useful for quantitative analysis of liquids, but not for solids. Only when small IRE's are used can reproducible contact be made with solid samples. This invention makes it possible to see the contact of solid sample on small IRE surfaces. Seeing this contact improves the reproducibility of analyses while assuring the analyst that the correct sample is analyzed.

Figure 6:
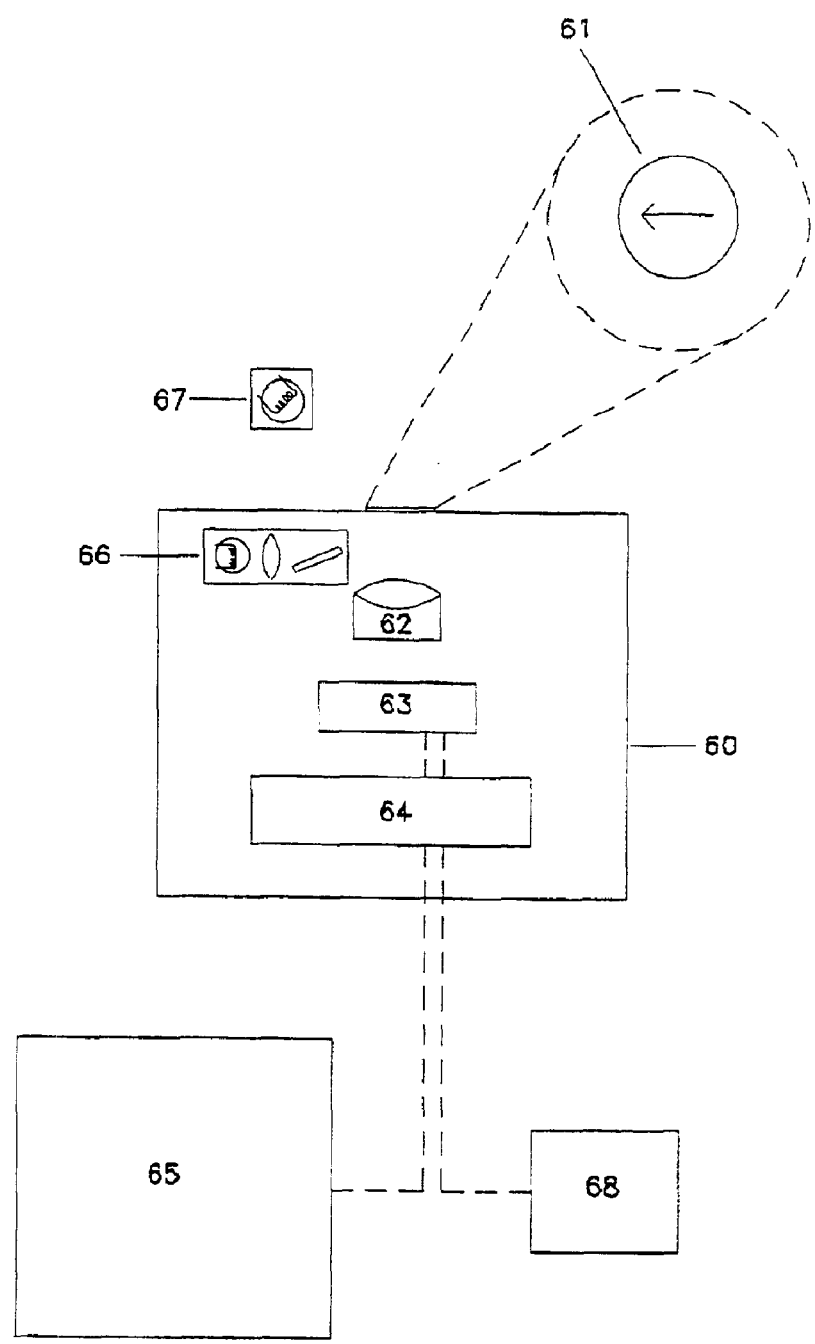
FIG. 6 is a schematic drawing showing the miniaturized opto-electronic magnifying system of the present invention in an inverted microscope, which produces magnified images of small objects on a TV monitor.

This invention also provides a simple video imaging system for inspection of objects at magnification. In this implementation, a fixed focus miniature opto-electronic magnifying apparatus is produced such that any object placed on its viewing port appears magnified on a monitor, computer terminal or TV. FIG. 6 is a schematic drawing showing the incorporation of the miniaturized opto-electronic magnifying system in a fixture for examination of or opaque objects. In FIG. 6, fixture 60 is a mechanical enclosure with a viewing port 61 supported by the enclosure. Viewing port 61 is a transparent, scratch resistant material with flat polished surfaces. While glass and some plastics may be used for the viewing port, quartz and sapphire are preferred scratch resistant transparent materials. Lens 62 forms a real image of the outer surface of viewing port 61 onto the photo-detector element 63. Lens 62 is selected to have the focal length and numerical aperture to produce the desired magnification and resolution. Multiple lenses on rotating disks or sliders could be used as well as zoom lens systems for variable magnifications. The photo-detector 63 is a CCD or other solid-state video camera electronics 64 that produces an electronic signal to a video monitor 65. The electrical power for the camera is supplied by power supply 68. The sample is placed on the viewing port surface 61 for inspection. The sample is lighted up by illuminators 66 and, or 67. For general use, a total magnification from 5 to 200 times is most practical, but a total magnification up to 1,500 is possible.

In this embodiment, the miniaturized opto-electronic magnifying system would have no moving parts other that possible changing magnifications. The sample would be placed on the viewing port and examined on the monitor.

The magnified image could be recorded on standard video recorders or imported to a computer through a video port. In this form, this invention is expected to have applications in teaching and industrial inspection.

FT-Raman spectrometers provides another example where inserting the miniaturized opto-electronic magnifying system of this invention into a spectrometer sample compartment has unique advantages. In FT-Raman, intense lasers with invisible near-infrared wavelengths (i.e. 1064 nm) are used to excite Raman spectra. If viewed directly these beams can cause serious damage to eye tissue. Since the laser beam is small, viewing the sample is important so that the laser beam can be positioned on the desired area. With inhomogeneous solids, it is critically important to see what the laser is focused on.

Figure 7:
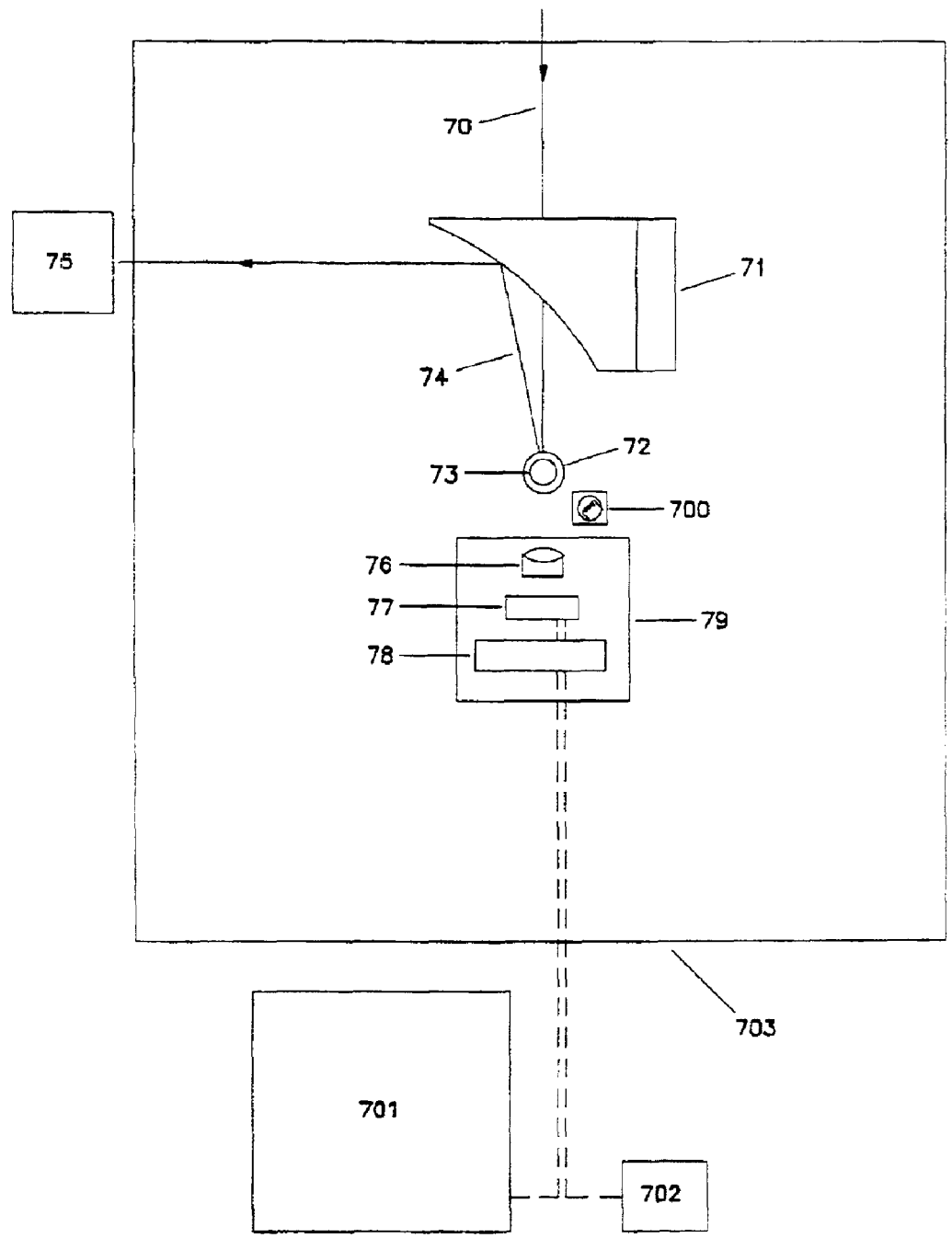
FIG. 7 is a schematic drawing showing the miniaturized opto-electronic magnifying system of the present invention placed in a sample compartment of an FT-Raman spectrometer to produce magnified images of the sample being analyzed.

FIG. 7 is a schematic drawing showing the miniaturized opto-electronic magnifying system of the present invention placed in a sample compartment of an FT-Raman spectrometer to produce magnified images of the sample being analyzed. Referring to FIG. 7, a laser beam 70 passes through a small opening in an aspherical mirror element 71 and is incident on a sample 72 contained in a glass tube 73. The laser radiation 70 is Raman scattered and the scattered radiation 74 is collected by the aspherical mirror 71. This mirror directs the Raman scattered radiation into the Fourier-transform spectrometer 75. Lens 76, solid-state photo-detector array 77 and camera electronics 78 comprise the MOM module 79. The sample may be lighted up by illuminator 700. The electronic image is sent to the video-monitor 701 to display a magnified image of the sample. The electrical power for the camera is provided by power supply 702. The mirror 71, sample 73, sample container 72, MOM module 79 are all contained inside the sample compartment (703) of the FT-Raman spectrometer.

Sample compartments of Raman spectrometers are small but the MOM module can be fitted inside to view the sample positioning in the laser beam. The small size is an important factor. The sample can be view at magnifications between 10 and 200 times and the near-infrared laser beam is weakly detected by the solid-state photo-detector array. In this embodiment, it is necessary to modify the sensing element. The standard configuration of silicon based CCD camera used for normal visible light imaging is to have a near-infrared blocking filter positioned over the devise. For the Raman application, it is necessary to remove this filter from the CCD camera.

Another objective of this invention, the MOM module is incorporated into an ATR probe to provided a magnified image of the contacting surface between the internal reflection element and the sample. In this embodiment an image plane mask restricts the area of the interface irradiated with infrared radiation. This system also has coaxial visible illumination to provide a means to see the area of the sample being analyzed using the MOM module. FIGS. 8*a* and 8*b* are schematic drawings of an ATR probe accessory apparatus that illustrates this application. Infrared radiant energy 80 from a spectrometer 79 is reflected from mirror 81 to mirror 82. The infrared radiation is focused by mirror 82 on to a variable mask 83 and then continues on to mirror 84. Mirror 94 redirects this beam on to the composite ZnSe-diamond IRE 85 mounted in a fixture 101. At the surface 86 of the diamond 100, the radiant energy is internally reflected. After reflection from the IRE-sample interface 86, the IRE element directs the infrared radiation back to mirror 84. On reflection from mirror 84, the infrared radiation is again focused on to variable mask 83 and continues to mirror 82. From mirror 82 the beam is directed to mirror 87 and then to an infrared radiant energy detector 88. The sample is lighted up with visible light from illuminator 89 when mirror 90 is positioned in the infrared beam path with a mechanical means 91. The visible light is coaxial with the infrared, passing through the variable mask 83, and is then redirected to the IRE-sample interface 86 by mirror 84. From mirror 84 the visible light is directed on to the transparent internal reflection element 85 to illuminate the sample area defined by the variable mask 83. A magnified image of the illuminated sample-IRE interface is produced by reflecting the light from mirror 92 in to a MOM 95 comprised of lens 93, photo-detector array 94 and electronic interface 97. The electrical signals are displayed on the video-display screen 96. The electrical power for the camera is provided by power supply 98. This probe apparatus has uses in extending the analysis by ATR into containers, analysis of biological growths on surfaces or materials on production lines.

Thus, the novel miniaturized opto-electronic magnifying system presented in this invention has achieved the above stated objectives and eliminates difficulties encountered in the use of prior devices and system, solves problems, reduces cost and obtains the desirable results described herein.

In the forgoing description, certain terms have been used for brevity, clarity and understanding, however, no unnecessary limitations are to e implied therefrom because such terms are for descriptive purposes only and are intended to be broadly construed. Moreover, the descriptions and illustrations are by way of examples and the invention, which is defined by the following claims, is not limited to the details shown and described.

We claim:

1. An opto-electronic image magnifying system comprising:
   (a) a lens designed, adapted and positioned to produce a magnified real image of a sample on one or more arrays of photo-detectors; and
   (b) electronic image magnifying apparatus comprising said array or arrays, electronic display apparatus and electronic scaling apparatus for producing a further magnified image of said sample on said display apparatus;
   wherein a minor fraction of the total magnification of said image from said sample to said display apparatus is produced by said lens, and a major fraction of the total magnification of said image from said sample to said display apparatus is produced by said electronic scaling apparatus.

2. An opto-electronic image magnifying system according to claim 1 wherein the ratio of the magnification produced by said electronic scaling apparatus to the magnification produced by said lens is between about 1.5 to 1 and 30 to 1.

3. An opto-electronic image magnifying system according to claim 1 wherein the ratio of the magnification produced by said electronic scaling apparatus to the magnification produced by said lens is between about 4 to 1 and about 10 to 1.

4. An opto-electronic image magnifying system according to claim 1 wherein said lens produces a magnified real image of said sample that is magnified between about 2 and about 10 times, and said electronic sealing apparatus further magnifies said magnified scale image between about 20 and about 100 times.

5. An opto-electronic image magnifying system according to claim 4 wherein said lens produces a magnified real image of said sample that is magnified between about 2 and about 5 times.

6. An opto-electronic image magnifying system according to claim 5 wherein said electronic scaling apparatus further magnifies said magnified scale image between about 15 and about 30 times.

7. An opto-electronic image magnifying system according to claim 1 wherein an image of said sample is magnified between about 5 and about 1500 times by said lens and said electronic scaling apparatus.

8. An opto-electronic image magnifying system according to claim 1 wherein an image of said sample is magnified between about 5 and about 200 times by said lens and said electronic scaling apparatus.

9. An opto-electronic image magnifying system according to claim 1, wherein said lens has a focal length between 2.5 and 50 mm.

10. An opto-electronic image magnifying system according to claim 1 wherein said array or arrays comprise photo-detectors having a nominal size of less than ½ inch.

11. An opto-electronic image magnifying system according to claim 1 wherein said array or arrays comprise photo-detectors having a nominal size of about ¼ inch.

12. An opto-electronic image magnifying system according to claim 1, wherein said electronic scaling apparatus comprises a charge coupled video camera.

13. An opto-electronic image magnifying system according to claim 1 where in said display or recording apparatus comprises a television receiver.

14. An opto-electronic image magnifying system according to claim 1 where in said display or recording apparatus comprises a computer monitor.

15. An opto-electronic image magnifying system according to claim 1 where in said display or recording apparatus comprises a recorder.

16. An opto-electronic image magnifying system according to claim 1 further comprising apparatus for supporting a sample in an object plane of said lens.

17. An opto-electronic image magnifying system according to claim 1 where in said apparatus for supporting a sample comprises a window or plate.

18. An opto-electronic image magnifying system according to claim 17, wherein the window or plate is transparent to visible light and is resistant to mechanical abrasion.

19. An opto-electronic image magnifying system according to claim 18, where in the window or plate is transparent to both visible light and infrared radiant energy.

20. An opto-electronic image magnifying system according to claim 19, wherein said window or plate comprises diamond, zinc selenide, KRS-5, NaCl, sapphire, calcoginide glass or zinc sulfide.

21. An opto-electronic image magnifying system according to claim 19, wherein said window or plate is part of an internal reflection element used for spectroscopic measurement.

22. An opto-electronic image magnifying system according to claim 1 further comprising white-light light emitting diodes, low voltage lamps or fiber optic illuminators adapted to illuminate a sample.

23. An opto-electronic image magnifying system according to claim 1 further comprising one or more white-light light emitting diodes and one or more optical fibers designed and adapted to illuminate a sample with white light from one or more of said diodes.

24. An opto-electronic image magnifying system according to claim 1 adapted to transmit images of a sample that is self-luminous or illuminated with ambient light.

25. An opto-electronic image magnifying system according to claim 1, wherein said display apparatus comprises a television monitor.

26. An opto-electronic image magnifying system according to claim 1, where in the said display recording apparatus comprises a computer monitor.

27. An opto-electronic image magnifying system comprising:
(a) a miniaturized opto-electronic image magnifier module comprising a lens and one or more photo-detector arrays, said lens being designed, adapted and positioned to produce a magnified real image of a sample on said array or arrays of photo-detectors, and said photodetectors being designed and adapted to produce an electronic signal is representative of said magnified real image;
(b) electronic display apparatus; and
(c) electronic image scaling apparatus designed and adapted to scale said electronic signal and produce a further magnified image of said sample on said display apparatus.

28. An opto-electronic image magnifying system according to claim 27 wherein said miniaturized opto-electronic image magnifier module comprises a board camera comprising said photo-detector arrays and circuitry that produces a signal that is representative of the image on said photo-detectors.

29. An opto-electronic image magnifying system according to claim 28 wherein said miniaturized opto-electronic image magnifier module is positioned within the sample chamber of a Fourier transform infrared spectrometer.

30. An opto-electronic image magnifying system according to claim 28 wherein said miniaturized opto-electronic image magnifier module is positioned within a thermal analysis systems.

31. An opto-electronic image magnifying system according to claim 28 wherein said miniaturized opto-electronic image magnifier module is positioned within a miniaturized probe for visual inspection.

32. An image magnifying system comprising:
(a) a support for a sample;
(b) a lens positioned to have a focal plane substantially at said sample, said lens having a focal length between about 2.5 and about 50 mm and being adapted to produce a magnified real image of at least a portion of said sample on one or more photo-detector arrays; and
(c) an electronic image scaling system comprising said array or arrays and electronic scaling apparatus for displaying or recording a further magnified image of said sample;
said image magnifying system being designed and adapted to produce an image that is magnified up to about 1000 times, with a minor fraction of the magnification of said image being produced by said lens, and a major fraction of the magnification of said image being produced by said electronic scaling apparatus.

33. An image magnifying system according to claim 32 wherein said electronic image scaling system comprises a television receiver, computer monitor or recorder.

34. An inverted opto-electronic microscope comprising:
(a) a transparent support for a sample;
(b) a lens positioned below said support and adapted to focus upon a sample positioned on said support;
(c) a board camera comprising said photo-detector arrays and circuitry that produces a signal that is representative of the image on said photo-detectors, said lens being designed, adapted and positioned to produce a magnified real image of said sample on one or more of said photo-detector arrays; and (d) electronic scaling apparatus designed and adapted to produce a further magnified image of said sample or a part of said sample on electronic display apparatus, with a minor fraction of the magnifying of said image from said sample to said display apparatus being provided by said lens and a major fraction of the magnification of said image being provided by said electronic scaling apparatus.

35. An accessory for infrared spectral analysis comprising:
   (a) an internal reflection element having a surface adapted to contact a sample and providing a first optical path for spectral measurement and a second optical path for viewing said sample;
   (b) a lens designed, adapted and positioned to produce a magnified real image of said sample on one or more arrays of photo-detectors; and
   (c) electronic image scaling apparatus comprising said array or arrays and means for displaying or recording a further magnified image of said sample on electronic display apparatus;
   wherein a minor fraction of the magnification of said image from said sample to said display apparatus is produced by said lens, and a major fraction of the magnification of said image from said sample to said display apparatus is produced by said electronic image scaling apparatus.

36. An accessory for infrared spectral analysis according to claim 35 wherein said internal reflection element comprises a diamond layer that defines said surface, and a supporting layer of a second infrared transmissive material.

37. An accessory for infrared spectral analysis according to claim 36 wherein said second infrared transmissive material comprises zinc selenide or KRS-5.

38. An accessory for infrared spectral analysis comprising:
   (a) an internal reflection element comprising a high refractive index material that is transparent to both infrared and visible radiant energy, said element having a surface adapted to contact a sample and providing a first optical path to and from said sample for spectral measurement and a second optical path to and from said sample for viewing the sample;
   (b) a miniaturized opto-electronic image magnifier module comprising a lens and one or more photo-detector arrays, said lens being designed, adapted and positioned to focus on a sample through said internal reflection element along said second optical path and to produce a magnified real image of a sample on said array or arrays of photo-detectors, said photo-detectors being designed and adapted to produce an electronic signal is representative of said magnified real image;
   (c) electronic display apparatus; and
   (d) electronic image scaling apparatus designed and adapted to scale said electronic signal and produce a further magnified image of said sample on said display apparatus.

39. A Fourier transform infrared spectrometer for spectral analysis comprising:
   (a) an internal reflection element that is transparent to both infrared and visible radiant energy and has a surface adapted to contact a sample, said element providing a first optical path to and from said sample for spectral measurement and a second optical path to and from said sample for viewing the sample;
   b) a spectral analysis system comprising a source of infrared radiant energy, a first optical system designed and adapted to focus a beam of said infrared energy on said sample and to collect infrared radiant energy and focus said energy onto an infrared radiant energy detector, said detector being designed and adapted to produce an electrical signal that is proportional to the intensity of the infrared radiant energy exiting said internal reflection element, and electronic circuitry designed and adapted to processes electronic signal from said detector and to produce infrared spectral data;
   (c) an optical viewing system comprising a miniaturized opto-electronic image magnifier module positioned with a sample compartment of said spectrometer, said module comprising a lens and one or more photo-detector arrays, said lens being designed, adapted and positioned to view a sample through said internal reflection element along said second optical path and to produce a magnified real image of a sample on said array or arrays of photo-detectors, said photodetectors being designed and adapted to produce an electronic signal is representative of said magnified real image, electronic display apparatus, and electronic image scaling apparatus designed and adapted to scale said electronic signal and produce a further magnified image of said sample on said display apparatus, wherein a minor fraction of the total magnification of said sample to said display apparatus is produced by said lens, and a major fraction of the total magnification of said image from said sample to said display apparatus is produced by electronic scaling apparatus.

40. A Fourier transform infrared spectrometer according to claim 39 wherein said internal reflection element comprises diamond, zinc selenide or KRS-5.

41. A Fourier transform infrared spectrometer according to claim 39 wherein said internal reflection element comprises a diamond layer that defines said surface, and a supporting layer of a second infrared transmissive material.

42. A Fourier transform infrared spectrometer according to claim 41 wherein said second infrared transmissive material comprises zinc selenide or KRS-5.

* * * * *